United States Patent [19]

Gideon et al.

[11] Patent Number: 5,012,958
[45] Date of Patent: May 7, 1991

[54] APPORTIONING UNIT FOR A FILLING SYSTEM FOR THE FILLING OF FOOD CANS

[75] Inventors: Jurgen Gideon, Verden; Dieter Krieger, Langwedel-Etelsen; Eirch Mengel, Verden/Borstel, all of Fed. Rep. of Germany

[73] Assignee: EFFEM GmbH, Verden/Aller, Fed. Rep. of Germany

[21] Appl. No.: 458,645

[22] PCT Filed: Apr. 19, 1989

[86] PCT No.: PCT/DE89/00237

§ 371 Date: Dec. 21, 1989

§ 102(e) Date: Dec. 21, 1989

[87] PCT Pub. No.: WO89/10304

PCT Pub. Date: Nov. 2, 1989

[30] Foreign Application Priority Data

Apr. 22, 1988 [IT] Italy .................................. 3813573

[51] Int. Cl.⁵ .......................................... B65D 88/54
[52] U.S. Cl. ................................. 222/306; 222/368; 277/226
[58] Field of Search ............... 222/345, 349, 306, 368, 222/363, 267, 271, 273, 264; 417/518, 519, 466, 532; 277/226

[56] References Cited

U.S. PATENT DOCUMENTS

| | | | |
|---|---|---|---|
| 356,122 | 1/1887 | Hodapp | 222/271 X |
| 1,164,831 | 12/1915 | McDermott | 417/519 X |
| 2,709,538 | 5/1955 | Harrington | 222/267 X |
| 3,684,409 | 8/1972 | Sanz et al. | 417/519 |
| 4,037,996 | 7/1977 | Loliger | 417/518 |
| 4,343,598 | 8/1982 | Schwing et al. | 417/519 X |
| 4,472,118 | 9/1984 | Schwing | 417/519 X |
| 4,569,642 | 2/1986 | Dwyer | 417/519 X |
| 4,624,465 | 11/1986 | Rogemont | 277/226 X |

FOREIGN PATENT DOCUMENTS

| | | |
|---|---|---|
| 18464 | 11/1980 | European Pat. Off. . |
| 179975 | 5/1986 | European Pat. Off. . |
| 733797 | 7/1955 | United Kingdom . |
| 1240807 | 7/1971 | United Kingdom . |

Primary Examiner—Donald T. Hajec
Assistant Examiner—Gregory L. Huson
Attorney, Agent, or Firm—Curtis, Morris & Safford

[57] ABSTRACT

An apportioning unit for the filling of food cans with a viscous, pasty or lumpy material, having at least one cylinder unit which is moved past a sealing plate, a lower part which is developed with a first passage hole for the filling material and is provided with an annular key arranged concentrically to the first passage hole, and an upper part which bears the sealing plate and is developed with a second passage hole for the filling material. The upper part has an annular groove which receives the annular key and is arranged concentrically to the second passage hole. The depth of the annular groove is greater than the height of the annular key and the annular groove receives an elastic annular tube.

3 Claims, 5 Drawing Sheets

APPORTIONING UNIT FOR A FILLING SYSTEM FOR THE FILLING OF FOOD CANS

BACKGROUND OF THE INVENTION

The present invention relates to an apportioning unit for the filling of food cans with a viscous, pasty or lumpy filling material, having at least one cylinder unit which is moved past a sealing plate.

In such apportioning units for the filling of food cans with a viscous, pasty or lumpy material, assurance must be had that the sealing plate is pressed with a well-defined pressure against the lower surface of the filling cylinder so that the open end of the filling cylinder can slide along the sealing plate while emergence of the filling material between the sealing plate and the open end of the filling cylinder is, however, dependably avoided.

OBJECTS OF THE INVENTION

The object of the invention is to create an apportioning unit in which the pressure with which the sealing plate is pressed against the open end of the filling cylinder satisfies these requirements.

SUMMARY OF THE INVENTION

This object is achieved in a first embodiment of the invention by a lower part which is developed with a first passage hole for the filling material and is provided with an annular spring which is arranged concentrically to the first passage hole and by an upper part which bears the sealing plate and is developed with a second passage hole for the filling material. The upper part is provided with an annular groove which receives the annular key and is arranged concentrically to the second passage opening. The depth of the annular groove is greater than the height of the annular key and the annular groove also receives an elastic annular tube.

A second embodiment is characterized by a lower part which is developed with a first passage hole for the filling material and is provided with an annular groove arranged concentrically to the first passage hole. An upper part is provided which is developed with a second passage hole for the filling material and is provided with an annular key which is concentric to the second passage hole and engages in the annular groove. The depth of the annular groove is greater than the height of the annular key and the annular groove also receives an elastic annular tube.

It is furthermore proposed that the annular tube be filled with air.

BRIEF DESCRIPTION OF THE DRAWINGS

Other features and advantages of the invention are set forth in the claims and the specification, in which one embodiment of the invention is explained with reference to the drawing, in which:

DETAILED DESCRIPTION OF PREFERRED EMBODIMENT

Figure 1:
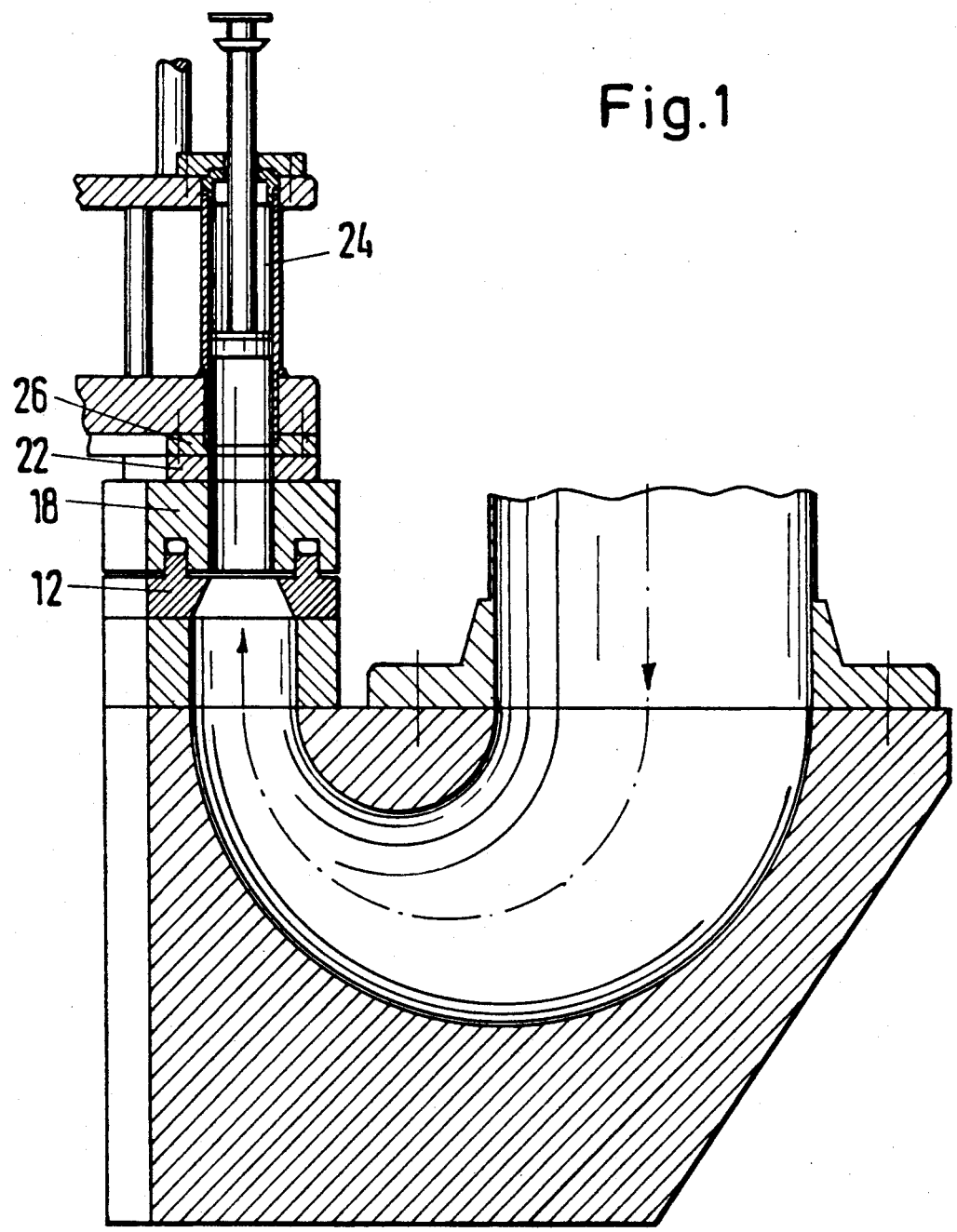
FIG. 1 shows a sectional view of an apportioning unit according to the invention.

FIG. 1 shows an apparatus for the filling of food cans with a viscous, pasty or lumpy material which consists of a lower part 12, an upper part 18, and a plurality of filling cylinders 24 which are moved past a sealing plate 22.

The filling cylinders 24 are provided with sealing flanges which slide over the sealing plate 22, each filling cylinder 24 receiving, upon each filling process, an amount of filling material which is to be subsequently introduced into a food can.

In order to permit a dependable transfer between the upper part 18 of the apportioning unit and the filling cylinder 24, the sealing plate 22 must be pressed with a suitable pressure against sealing flanges 26 of the filling cylinders 24. This pressure must be great enough so that no filling material emerges between the sealing plate 22 and the sealing flange 26. On the other hand, this pressure must also not be too great, since it must be assured that sliding between the sealing flanges 26 and the sealing plate 22 be readily attained.

In order to permit the application of the sealing plate against the sealing flanges 26 with such a constant pressure, an annular-groove/annular-key development is provided between the lower part 12 and the upper part 18 of the apportioning unit. The depth of the annular groove 20 is, in this case, greater than the depth of the annular key 14, so that even with the upper part 18 lying on the lower part 12, a space remains between the surface of the annular key 14 and the bottom of the annular groove 20. An annular tube 28 which is filled with air is placed within this remaining space.

The annular tube 28, therefore, presses the upper part 18, together with the sealing plate 22 resting on it, away from the lower part 12 in the direction toward the sealing flanges 26. The application pressure between the sealing plate 22 and the sealing flanges 26 results from the pressure which acts on the annular tube 28.

Figure 2A:
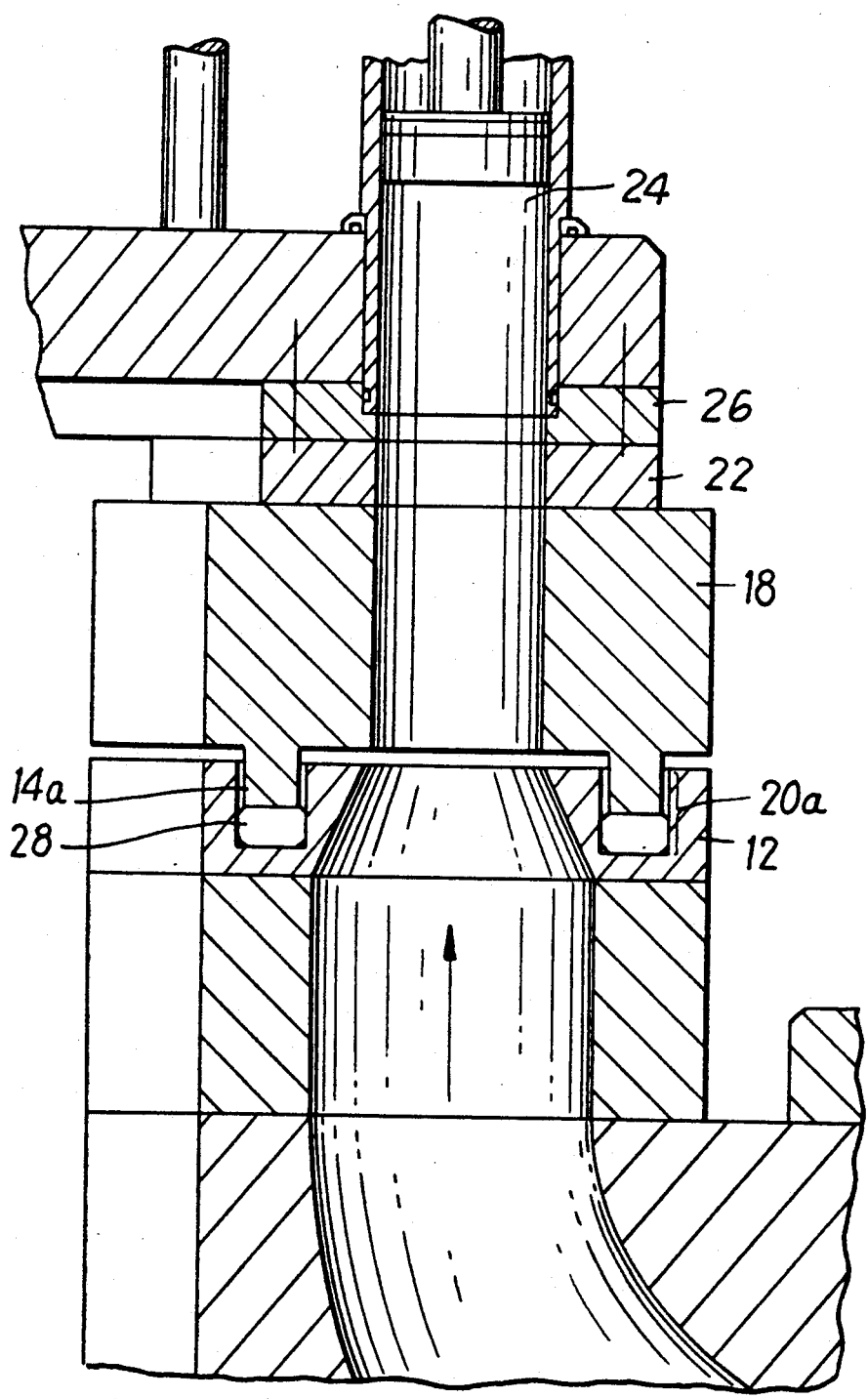
FIG. 2A is a view similar to FIG. 2 showing an alternate embodiment of the invention.
Figure 2:
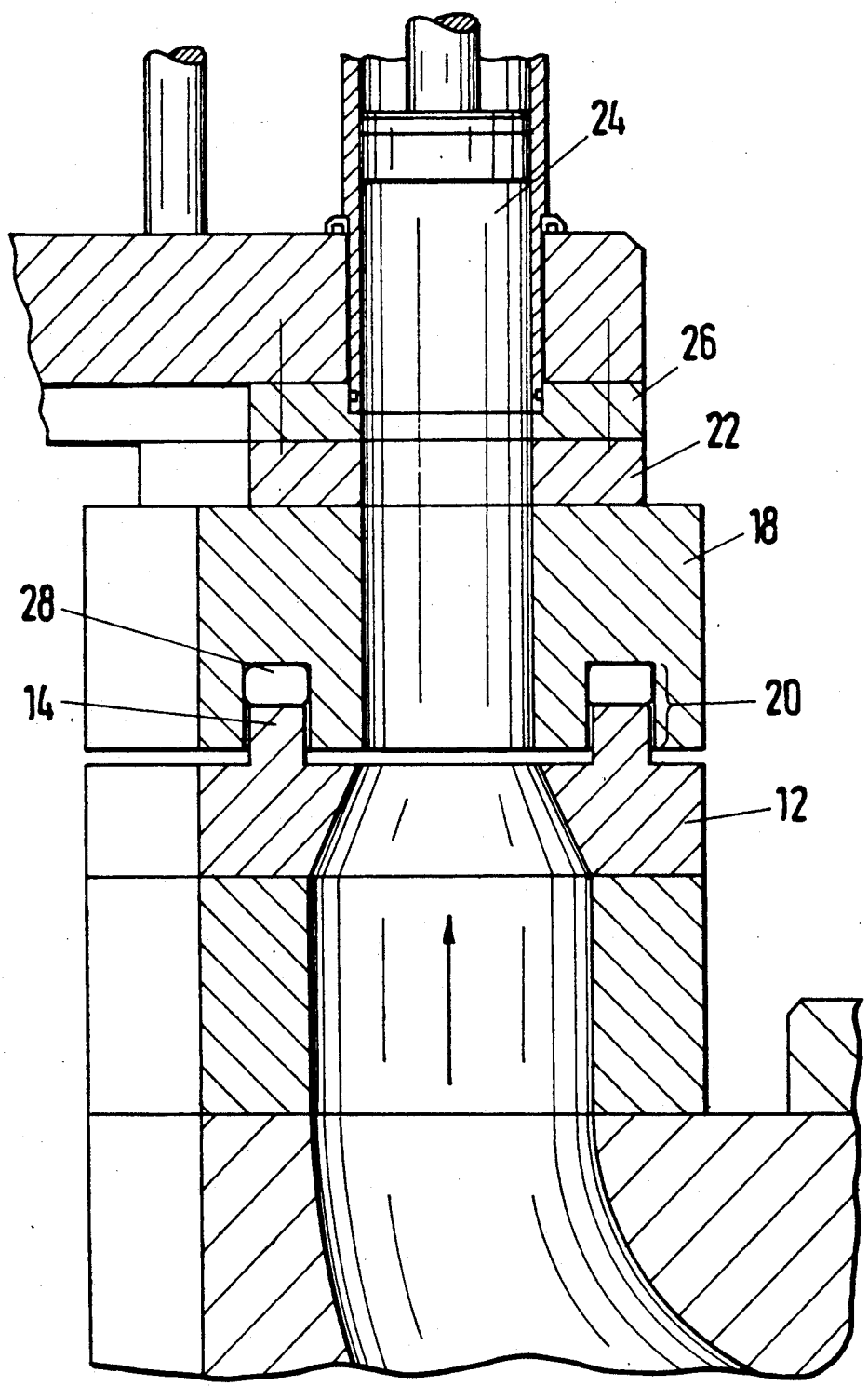
FIG. 2 is a view on a larger scale which shows the apportioning unit in a position in which the upper part which bears the sealing plate is pressed against the cylinder unit.

FIG. 2A shows an alternate embodiment of the present invention in which the annular key 14a extends from the upper part 18 and annular groove 20a is provided in the lower part 12. The depth of the annular groove 20a is, as in the embodiment shown in FIG. 2, greater than the depth of the annular key 14a so that even with the upper part 18 lying on the lower part 12, a space remains between the surface of the annular key 14a and bottom of the annular groove 20a. As in the embodiment shown in FIG. 2, an annular tube 28 which is filled with air is placed within this remaining space.

Figure 3:
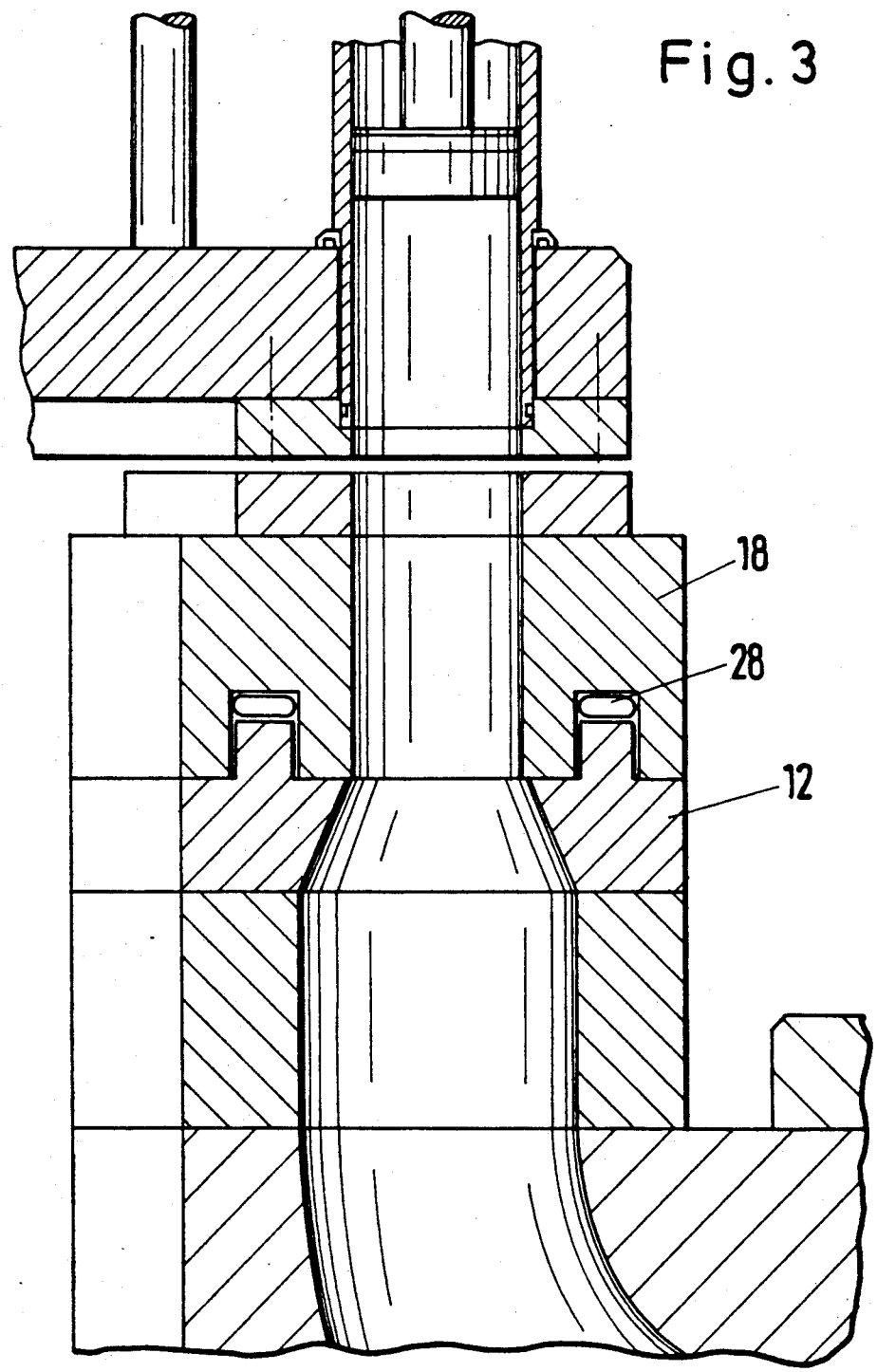
FIG. 3 is a showing corresponding to FIG. 2, with the upper part lowered.

FIG. 3 shows that, upon reduction of the pressure in the annular tube 28, the upper part 18 can be lowered onto the lower part 12, for instance, for maintenance or cleaning work.

Figure 4:
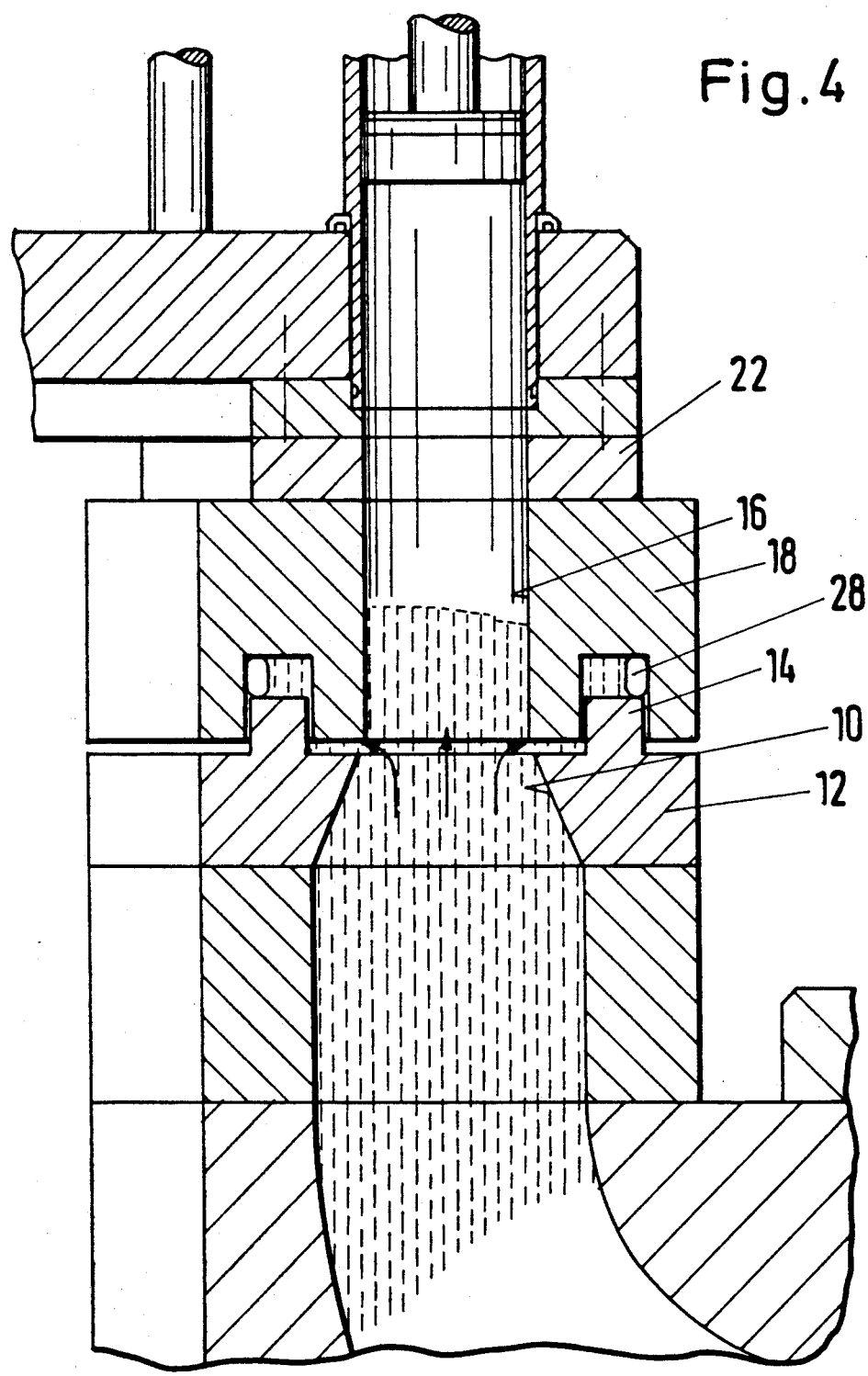
FIG. 4 is a showing corresponding to FIGS. 2 and 3, with a defective tube.

Finally, FIG. 4 shows that even if the annular tube 28 should lose air, the function of the tube is still operative on an emergency basis when the passage openings 10 are acted on by the filling material. The filling material will press the annular tube 28 outward and thus seal off the space. The pressure of the filling material in this case replaces the function of the pretensioned annular tube. Even in the case of a sudden drop of pressure in the annular tube 28, the function is thus maintained, at least on an emergency basis.

The proposed development of an apportioning unit thus makes it possible, in filling operations where the filling cylinders are moved past a sealing plate, to fill material to press the sealing plate with a predetermined pressure against them. This function is assured, in any event on an emergency basis, even in case of the failure of the pressing means.

The features of the invention disclosed in the above specification, the drawing and the claims can be essential, both individually and in any desired combination, for the reduction to practice of the various embodiments of the invention.

What is claimed is:

1. An apportioning unit for filling of food cans with a viscous, pasty or lumpy filling material, having at least one cylinder unit which is moved past a sealing plate, comprising:
   a lower part having a first passage hole for the filling material and provided with an annular key which is arranged concentrically to said passage hole, and
   an upper part which bears a sealing plate and having a second passage hole for the filling material, said upper part being provided with an annular groove which receives said annular key and wherein said annular groove being arranged concentrically to said second passage hole,
   the depth of said annular groove being greater than the height of the annular key and said annular groove receiving an elastic annular tube.

2. An apportioning unit for filling of food cans with a viscous, pasty or lumpy material, having at least one cylinder unit which is moved past a sealing plate, comprising:
   a lower part having a first passage hole for the filling material, said lower part being provided with an annular groove arranged concentrically to said first passage hole, and
   an upper part having a second passage hole for the filling material and said upper part being provided with an annular key which engages in said annular groove and is arranged concentrically to the second passage hole,
   the depth of said annular groove being greater than the height of said annular key and said annular groove receiving an elastic annular tube.

3. An apportioning unit according to claim 1 or 2, where said annular tube is filled with air.

* * * * *